Feb. 9, 1954  W. W. CUSHMAN  2,668,602
INDUSTRIAL TRUCK
Filed Nov. 17, 1952
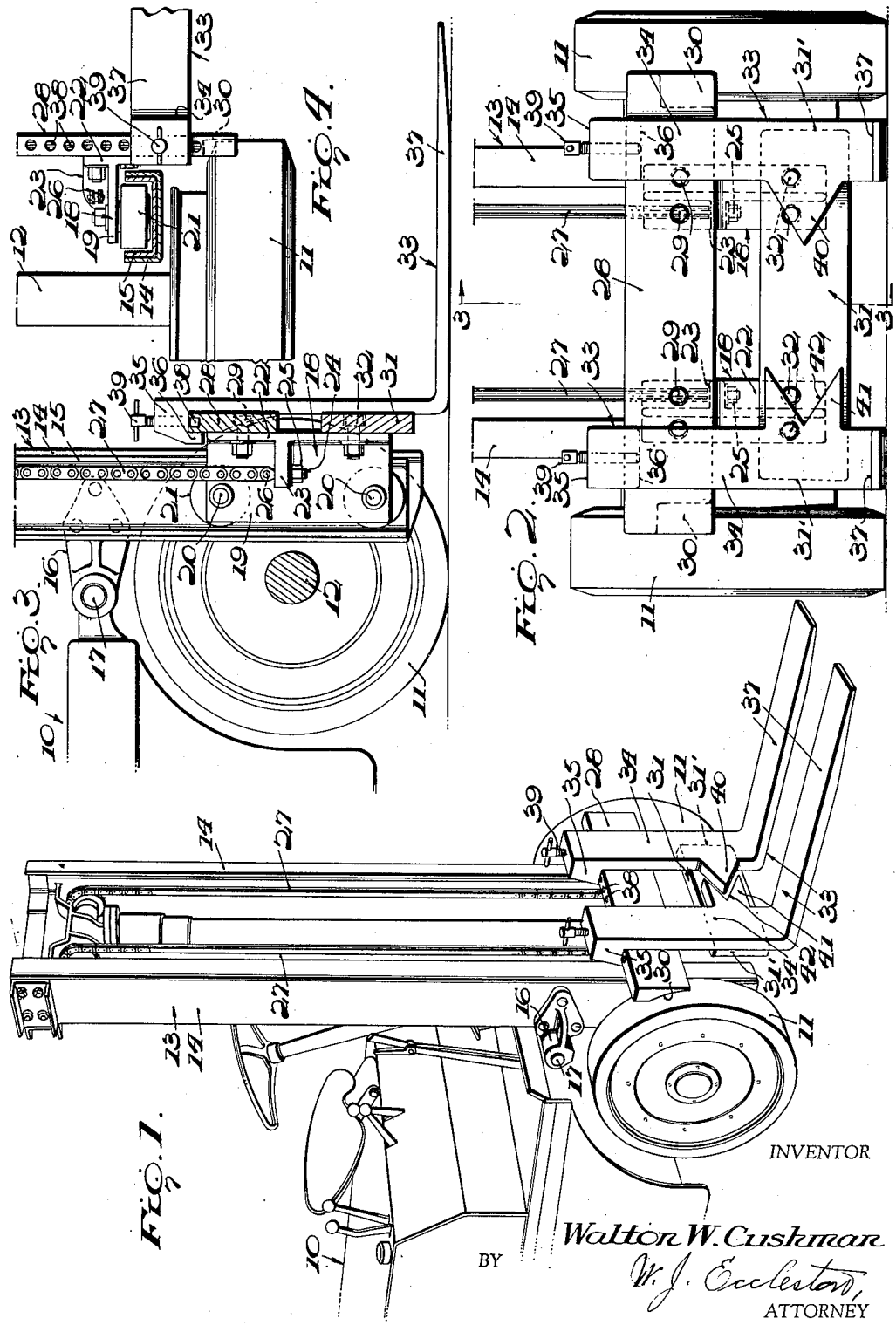
INVENTOR
Walton W. Cushman
BY
W. J. Eccleston
ATTORNEY

Patented Feb. 9, 1954

2,668,602

UNITED STATES PATENT OFFICE 2,668,602

INDUSTRIAL TRUCK

Walton W. Cushman, Webb City, Mo.

Application November 17, 1952, Serial No. 321,066

5 Claims. (Cl. 187—9)

(Granted under Title 35, U. S. Code (1952), sec. 266)

The invention described herein, if patented, may be manufactured and used by or for the Government for governmental purposes, without the payment to me of any royalty thereon.

My invention relates to improvements in industrial trucks of the fork-lift type.

A main limiting factor in the load carrying capacity of fork-lift trucks resides in the location of the lifting carriage and forks, as well as the vertical frame or mast upon which the carriage travels, relative to the front wheels of the truck. When the load is placed upon the lifting forks or tines and the carriage is elevated, the truck tends to pivot or upset about the front wheels, which act as a fulcrum. For this reason, it is always desirable to mount the vertical mast and lifting carriage as close to the front wheel axle as possible, in order to reduce to a minimum the moment about the front wheels of the truck produced when the load is raised. For a fork-lift truck of a given capacity and weight, it would be possible to increase the lifting capacity a considerable amount, such as from 15 to 20 percent by merely shifting the vertical mast and lifting carriage rearwardly toward the front axle of the truck by as little as an inch and a half, or the like. This, however, cannot normally be accomplished, since the construction of the vertically shiftable lifting carriage is such that it must be arranged forwardly of the front wheels of the truck in order to clear the front wheels when the carriage is fully lowered. Accordingly, the present practice is to position the vertical mast or frame so as to bring the lifting carriage as close to the forward sides of the front wheels as possible when the carriage is fully lowered and yet provide some clearance between the wheels and carriage. With this conventional arrangement, the lifting carriage and forks are still a considerable distance forwardly of the front axle of the truck and considerable tendency for the truck to pivot or upset about its front wheels is reduced by the load upon the lifting forks.

A primary object of the present invention is to provide a fork-lift truck having a greater load lifting capacity than conventional trucks of the same type and weight.

A further object is to provide a fork-lift truck wherein the vertical mast and the lifting carriage which travels along the mast are arranged nearer the front axle of the truck than is the usual practice, the lifting carriage being constructed so as not to interfere with the front wheels of the truck when in the fully lowered position.

A further object is to provide a lifting carriage for fork-lift trucks which may be arranged closer to the front axle of the truck without interference with the front wheels, and without sacrificing any of the normal lateral adjustability of the lifting forks or tines.

A still further object of the invention is to provide a fork-lift truck of increased lifting capacity without materially increasing the cost of construction or sacrificing any of the normal utility of the truck.

Other objects and advantages of the invention will be apparent during the course of the following description.

In the accompanying drawings, forming a part of this application, and in which like numerals are employed to designate like parts throughout the same, Figure 1 is a fragmentary perspective view of a fork-lift truck embodying my invention, Figure 2 is a fragmentary front elevation of the same, Figure 3 is a longitudinal vertical section on line 3—3 of Figure 2, and, Figure 4 is a fragmentary plan view of parts of the truck.

In the drawings where for the purpose of illustration is shown a preferred embodiment of the invention, the numeral 10 designates generally a fork-lift truck having front wheels 11, journaled upon a front transverse axle 12. The usual upright frame or mast 13 is provided, and this mast 13 is arranged slightly forwardly of the front axle 12, although closer to the front axle than is the case in most conventional fork-lift trucks. The mast 13 comprises the usual sets of telescoping channels or guides 14 and 15, and supporting elements or bearings 16 are rigidly secured to the outer channels 14 near and above the tops of the front wheels 11, as shown. The bearings 16 pivotally receive trunnions 17, in turn rigidly secured to the body portion of the truck 10. The trunnions 17 and bearings 16 constitute the supporting means for the mast 13, and also provide means for tilting the mast in a conventional and well-known manner. Except for the arrangement of the mast 13 nearer the front axle 12, the construction thus far described is that of a substantially conventional fork-lift truck.

The lifting carriage of the truck comprises a pair of vertically disposed T-shaped members 18 or carriage sections, arranged slightly inwardly of the sides of the mast 13 and having their longitudinal vertical webs 19 arranged opposite the open sides of the telescoping channels 14 and 15, Figure 4. Near their upper and lower ends, the webs 19 have shafts 20 rigidly secured thereto, and guide rollers 21 are journaled upon the outer ends of the shafts 20 and disposed within the inner channels 15 of the mast 13 for rolling engagement therewith. The forward transverse vertical webs 22 of the T-shaped carriage sections 18 are arranged slightly forwardly of the outer channels 14, as shown, and apertured lugs 23 are preferably formed integral with the webs 19 and 22 at the inner sides of the members 18 and near the vertical centers of the same.

The apertured lugs 23 receive clevis bolts 24 or the like, provided upon their lower ends with nuts 25, arranged below the lugs 23. Above the lugs 23, the clevis bolts 24 are secured as at 26 to the lower ends of vertical sprocket chains 27, which operate between the sides of the mast 13 in the usual manner for raising and lowering the lifting carriage along the mast 13.

The lifting carriage further comprises an upper horizontal bar or rail 28, having its upper edge spaced somewhat above the tops of the T-shaped members 18, and rigidly bolted to the forward webs 22 of the T-shaped members by means of countersunk bolts 29. The length of the upper rail 28 is such that its opposite ends terminate near the transverse centers of the front wheels 11, and when the lifting carriage is fully lowered, as shown in the drawings, the ends of the top rail 28 are arranged forwardly of the front wheels 11 and overlap the front wheels laterally, as shown in Figure 2.

When the carriage is fully lowered, the top rail 28 is diposed above the front axle 12 and does not pass the forward sides of the front wheels and interfere therewith. In order that the mast 13 and load-lifting carriage may be located as close to the front axle 12 as possible, the end portions of the top rail 28 adjacent to the front wheels 11 may be cutaway or notched at the rear side of the top rail, as indicated at 30. The notches 30 may be omitted if desired, without sacrificing any considerable amount of the advantage gained by the location of the mast 13 and lifting carriage nearer the front axle 12.

The lifting carriage further comprises a lower transverse bar or rail 31, similar to the top rail 28 but shorter than the top rail so that its opposite ends 31' are arranged inwardly of the front wheels 11 as best shown in Figure 2. The lower carriage rail 31 is spaced vertically below the top rail 28, and is rigidly secured to the forward transverse webs 22 of the members 18 by countersunk bolts 32. The arrangement is such that when the vertically movable lifting carriage is fully lowered, as shown in the drawings, the shortened lower rail 31 of the carriage passes between the front wheels 11 and does not interfere with the same. If the lower rail 31 was of the same length as the top rail 28, the lower rail would strike the forward sides of the front wheels 11, and the carriage could not be fully lowered, with the mast 13 located as close to the front axle 12 as is the case in my improved construction.

L-shaped lifting forks 33 are adjustably mounted upon the vertically movable lifting carriage, and the forks 33 comprise vertical sections or bars 34, which bear against the forward faces of the upper and lower rails 28 and 31 and are slidable thereon. The upper ends of the vertical bars 34 project above the top horizontal edge of the upper rail 28, and the bars 34 are formed at their top ends to provide rearwardly projecting extensions or heads 35, integral therewith. Short depending extensions or shoulders 36 are integrally secured to the rear sides of the heads 35, Figures 3, and the depending extensions 36 extend over the rear face of the top rail 28, for detachably securing the lifting forks 33 to the vertically movable carriage of the truck. In effect, the forks 33 are suspended from the top rail 28 by means of the heads 35 and depending flanges 36, the vertical bars 34 of the lifting forks bearing against the forward faces of the rails 28 and 31. The forks 33 also include forwardly extending horizontal tines 37, preferably formed integral with the vertical bars 34, as shown, and adapted to contact the floor in front of the truck 10 when the lifting carriage is fully lowered.

The length of the top rail 28 is such that the two L-shaped forks 33 may be adjusted laterally a desired amount. To facilitate adjusting the forks 33 laterally, and releasably holding the same in selected adjusted positions, the top rail 28 is preferably provided in its upper horizontal edge with a plurality of longitudinally spaced openings 38, adapted to receive the lower ends of vertical adjusting screws 39, received within vertical screw-threaded openings in the heads 35. The screws 39 and openings 38 serve to positively hold the lifting forks 33 in the selected laterally adjusted positions, but the adjusting screws may be omitted entirely if desired.

When a load is placed upon the tines 37 of the lifting forks, the lower ends of the vertical bars 34 react against the lower rail 31, and it is necessary that the bars 34 bear against the lower rail in all laterally adjusted positions of the forks 33. With the lower rail 31 foreshortened as previously described, the vertical bars 34 are shifted beyond the ends of the lower rail 31 when the forks 33 are laterally spaced apart the maximum possible distance, as defined by the length of the top rail 28. To insure a continuous bearing of the forks 33 against the lower rail 31 in the outermost adjusted positions of the forks, I form upon one vertical bar 34 a substantially V-shaped bearing extension 40, preferably formed integral with the bar 34 near the lower end of the same and adjacent to the lower rail 31. The V-shaped extension 40 has its rear vertical face flush with the rear face of the vertical bar 34 carrying it, for sliding engagement with the front face of the lower rail 31. A companion interfitting bearing extension 41 is integrally formed upon the inner side of the other vertical bar 34 near the lower end of the same, and adjacent to the lower rail 31. The rear face of the bearing extension 41 is also flush with the rear face of the bar 34 carrying it, for sliding engagement with the lower rail 31. The extension 41 has a V-shaped notch 42 formed in its inner end, for receiving the V-shaped bearing extension 40, and permitting interfitting engagement of the bearing extensions 40 and 41, when the forks 33 are adjusted inwardly.

With the described arrangement, the forks 33 may be shifted laterally inwardly for the desired distance by virtue of the interfitting engagement of the bearing extensions 40 and 41. Also, the forks may be shifted laterally outwardly to the ends of the top rail 28, without the loss of bearing between the forks and lower rail 31. This is true, since the bearing extensions 40 and 41 will continue to bear against the forward face of the lower rail 31, after the vertical bars 34 have moved beyond the ends of the foreshortened lower rail 31.

It is thus seen that the described arrangement permits shifting the mast 31 and vertically moving carriage closer to the front axle 12, and thereby materially increasing the load lifting capacity of the truck, without increasing its weight or sacrificing any of the adjustability of the lifting forks 33. The arrangement is highly simplified and compact, and does not add materially to the cost of the industrial truck or sacrifice any of its utility in the performing of a wide variety of material handling operations. By shifting the mast 13 and associated elements slightly nearer the front axle 12, the tendency for the truck to pivot or upset about the front wheels 11, under the influence of a given load is materially reduced, and I have found that the load lifting capacity of the truck may be increased as much as 15 to 20 percent by shifting the mast 13 as little as an inch to an inch and one-half closer to the axle 12.

It is to be understood that the form of the invention, herewith shown and described is to be taken as a preferred example of the same, and that various changes in the shape, size and arrangement of parts may be resorted to, without departing from the spirit of the invention or scope of the subjoined claims.

I claim:

1. In a fork-lift truck having front wheels and an upright mast arranged between the front wheels, a carriage connected with the upright mast for movement therealong and including upper and lower transverse bars, the lower transverse bar of the carriage being shorter than the upper bar and adapted to pass between the front wheels of the truck rearwardly of their forward peripheral parts when the carriage is fully lowered, and lifting forks mounted upon the carriage and shiftable laterally thereof to selected adjusted positions, the lifting forks having inwardly directed bearing extensions which engage the lower bar of the carriage and react thereagainst when the lifting forks are shifted to the outer ends of the upper bar of the carriage.

2. In an industrial truck having front wheels and a substantially vertical mast arranged between the front wheels, a substantially vertical carriage connected with the mast for movement thereon, the carriage having a top relatively wide portion and a bottom relatively narrow portion, the relatively narrow portion of the carriage passing between the front wheels of the truck rearwardly of their forward peripheral parts when the carriage is fully lowered, a pair of lifting forks carried by the carriage and movable transversely thereof throughout substantially the entire width of said top relatively wide portion, and interfitting bearing extensions secured to the lifting forks and overlapping the forward side of said bottom relatively narrow portion of the carriage, the bearing extensions engaging the relatively narrow portion when the lifting forks are shifted to the outer ends of said relatively wide portion of the carriage.

3. In an industrial truck having front wheels and an upright mast arranged between the front wheels, a carriage for movement longitudinally of the mast and having an upper part wider than the space between the front wheels and a lower part narrower than the space between the front wheels and adapted to pass between the wheels when the carriage is lowered, a pair of lifting elements including substantially vertical parts having sliding engagement with said upper part of the carriage and adjustable laterally of the carriage for substantially the entire width of said upper part, the vertical parts of the lifting elements passing beyond the ends of said lower part of the carriage when the lifting elements are arranged near the ends of said upper part of the carriage, and interfitting lateral extensions secured to the vertical parts of the lifting elements forwardly of said lower part of the carriage and adapted to bear against said lower part when the lifting elements are fully separated, the interfitting extensions permitting the lifting elements to be shifted together and arranged near the transverse center of the carriage.

4. In an industrial truck having front wheels and an upright mast arranged between the front wheels and somewhat rearwardly of their leading edges, a carriage connected with the upright mast for movement therealong and including an upper relatively long transverse rail and a lower relatively short transverse rail spaced below the upper rail, the lower relatively short rail passing between the front wheels of the truck rearwardly of their leading edges when the carriage is fully lowered, the upper relatively long rail being longer than the space between the front wheels and remaining beyond the peripheries of the front wheels in all adjusted positions of the carriage, substantially L-shaped lifting forks connected with the carriage and including vertical parts which slidably engage the forward faces of the upper and lower rails, the lifting forks being adjustable transversely of the carriage to positions near the outer ends of the upper relatively long rail, the vertical parts of the L-shaped lifting forks then being disposed beyond the ends of the relatively short lower rail, a lateral extension secured to the inner side of the vertical part of one L-shaped lifting fork and adapted to bear against the forward face of the lower rail and provided in its inner end with a recess, and a tapered extension secured to the inner side of the vertical part of the other L-shaped lifting fork and adapted to bear against the forward face of the lower rail and entering the recess of the first-named extension when the lifting forks are in their innermost adjusted positions.

5. In an industrial truck having front wheels and an upright mast arranged between the front wheels, a substantially vertical carriage connected with the mast for movement thereon and having a top relatively wide part incapable of passing between the front wheels and a bottom relatively narrow part adapted to pass between the front wheels when the carriage is fully lowered, said top and bottom parts of the carriage having forward bearing surfaces arranged in substantially the same vertical plane, a pair of substantially L-shaped lifting forks suspended from the top relatively wide part of the carriage and bearing against the forward bearing surface of the bottom carriage part, a transverse extension secured to the inner side of one lifting fork adjacent to the bottom carriage part and having a V-shaped notch formed therein, the extension bearing against the forward bearing surface of the bottom carriage part when the lifting fork having said transverse extension is shifted beyond one end of the bottom carriage part, and a transverse V-shaped extension secured to the inner side of the other lifting fork adjacent to the bottom carriage part and entering the V-shaped notch of the first-named extension when the lifting forks are adjusted laterally inwardly, the V-shaped extension bearing against the forward bearing surface of the bottom carriage part when the lifting fork having the V-shaped extension is shifted beyond the other end of said bottom carriage part.

WALTON W. CUSHMAN.

References Cited in the file of this patent

UNITED STATES PATENTS

| Number | Name | Date |
|---|---|---|
| 2,642,157 | Milz | June 16, 1953 |